United States Patent [19]

Rice et al.

[11] Patent Number: 4,712,230

[45] Date of Patent: Dec. 8, 1987

[54] MONITORING AND RECORDING APPARATUS FOR CONNECTION TO A TELEPHONE LINE

[76] Inventors: John E. Rice, 3456 El Segundo Blvd., Hawthorne, Calif. 90250; James M. Rice, 510 Roosevelt Rd., Long Beach, Calif. 90807; Robert W. Rice, 5068 Auburn Dr., San Diego, Calif. 92105

[21] Appl. No.: 869,350

[22] Filed: Jun. 2, 1986

Related U.S. Application Data

[63] Continuation-in-part of Ser. No. 671,688, Nov. 15, 1984, abandoned.

[51] Int. Cl.⁴ .................. H04M 15/04; H04M 15/18; H04M 15/22
[52] U.S. Cl. .................................... 379/112; 379/133
[58] Field of Search ................. 379/112, 34, 113, 111, 379/133, 140, 119, 135

[56] References Cited

U.S. PATENT DOCUMENTS 4,332,982  6/1982  Thomas .................. 179/7.1 TP X
4,404,433  9/1983  Wheeler et al. ............ 179/7.1 TP
4,585,904  4/1986  Mincone et al. ........... 179/7.1 TP Primary Examiner—Stafford D. Schreyer
Attorney, Agent, or Firm—Monty Koslover

[57] ABSTRACT

An improved telephone monitoring and recording apparatus is described. The monitoring and recording apparatus is connected in parallel with one or more telephones for the purpose of recording in memory and printing out on paper for each call detected, information which is typically: the number dialed, the time and date the call was made, and the duration of call. Other information which is also monitored and recorded in memory is also typically; the station originating the call, the number of rings, whether the destination was 'busy' and whether there was a voice communication. These and other similar information requests may be programmed in at installation using a keyboard, and printed out on the printer which is part of the apparatus. The equipment is improved in that it can be used with any telephone set up desired, without modification. It can identify both rotary pulse dialed and "Touch Tone" dialed numbers without manual selection and switching. It will maintain itself monitoring and recording (but not printing) even when power is lost for periods of time. It can not be easily defeated or interfered with, without a record being made of the interference and an alarm being given. The keyboard is removable after operation is initiated, so as to make the equipment secure from interference.

5 Claims, 11 Drawing Figures

MONITORING AND RECORDING APPARATUS FOR CONNECTION TO A TELEPHONE LINE

This application is a continuation-in-part of application Ser. No. 06/671,688 filed 11/15/84, abandoned.

BACKGROUND OF THE INVENTION

1. Field of the Invention

This invention relates to an improvement in monitoring and recording apparatus for connection to a telephone line, and more particularly to an apparatus that will record desired information on all outgoing calls made on any phone, or phones which are connected in parallel with the apparatus.

2. Description of the Prior Art

Monitoring and recording apparatus which belongs to the same general category as this invention, is already on the market and several patents exist. Among these are U.S. Pat. Nos. 4,404,433 by Wheeler and Beusch, and 4,332,982 by Thomas. In the apparatus of Wheeler and Beusch, determination and recording is made of the telephone number called, the duration of the call and the time of the call. A printer prints out the record, and the device may be manually selected for "Touch Tone" or rotary dialed phone monitoring. In the Thomas device, the number dialed, the call duration and the time and date of the call are recorded for printout. Both the Thomas and Wheeler devices are serially connected to telephone devices. The Thomas device also actively controls access to outside lines by disconnecting the telephone instrument if the call is not authorized.

In all the present devices, recording of dialed calls can be defeated easily, usually by a simple "on/off" switch located at the outside of the unit. Furthermore, no provision is made for recording the interruption or disconnection of the device by persons intent on defeating the device.

The Thomas apparatus, which is intended for use with a long distance network, must be installed only at a telephone exchange connected to a subscriber line. The apparatus cannot be connected directly at the subscribers station. On the other hand, the Wheeler and Beusch apparatus suffers from the fact that it can only be installed in series at a subscriber's station. This situation is typical of the monitoring and recording devices currently available. Thus, there exists a need for an improved monitoring and recording apparatus capable of general installation application, and having a non-defeatable recording of all calls made and received.

SUMMARY OF THE INVENTION

The invention comprises line monitor circuits connected to the telephone line for sensing dialing, call start and completion, and telephone line status; computer processing circuits connected to the line monitor circuits for recognizing, storing and processing the detected signals and for calculating call start and duration information including time and date; printer circuits connected to the computer processing circuits for the purpose of providing a printout of call activities, and a power supply.

The line monitor circuit connector is intended to be hooked up in parallel with the outgoing lines of one or more telephones, and may be located some distance from the telephones being monitored, so as to preclude interference with the device. Both rotary dialed and dual tone multifrequency (DTMF) calling signals are automatically monitored by the device without any need for manual selection.

In addition to a paper printout, a continuous display is given of the status of calls in progress. A battery provides 'keep alive' power for the monitoring circuits but not the printer, for a short time period, in the event of an interruption in main power. When main power is resumed, the interruption time and status is displayed and printed.

In addition to monitoring outgoing calls, the line monitor circuits can be set to monitor incoming calls, so that a record is made also of any incoming call, recording if it was answered, the month day and time of the call and the call duration.

Accordingly, it is a principal object of this invention to provide an improved apparatus, capable of monitoring multiple or single telephones for both outgoing and incoming telephone calls, and recording desired identification of the call; its time, date and duration.

It is another object to provide for an improved secure monitoring device being essentially non-defeatable, and outputting an alarm and record of interference or interruption.

Another object is to provide means of automatically monitoring both rotary dialed and dual tone multifrequency calling signals. It is yet another object to provide a monitoring apparatus that can have its date and time generating component, reference accounting codes etc., quickly and easily reset or re-initialized without complicated procedures, or the need to partially disassemble the apparatus.

Further objects and advantages of the invention will become apparent from a study of the following portion of the specification, the claims and the attached drawings.

DESCRIPTION OF THE PREFERRED EMBODIMENTS

Figure 1A:
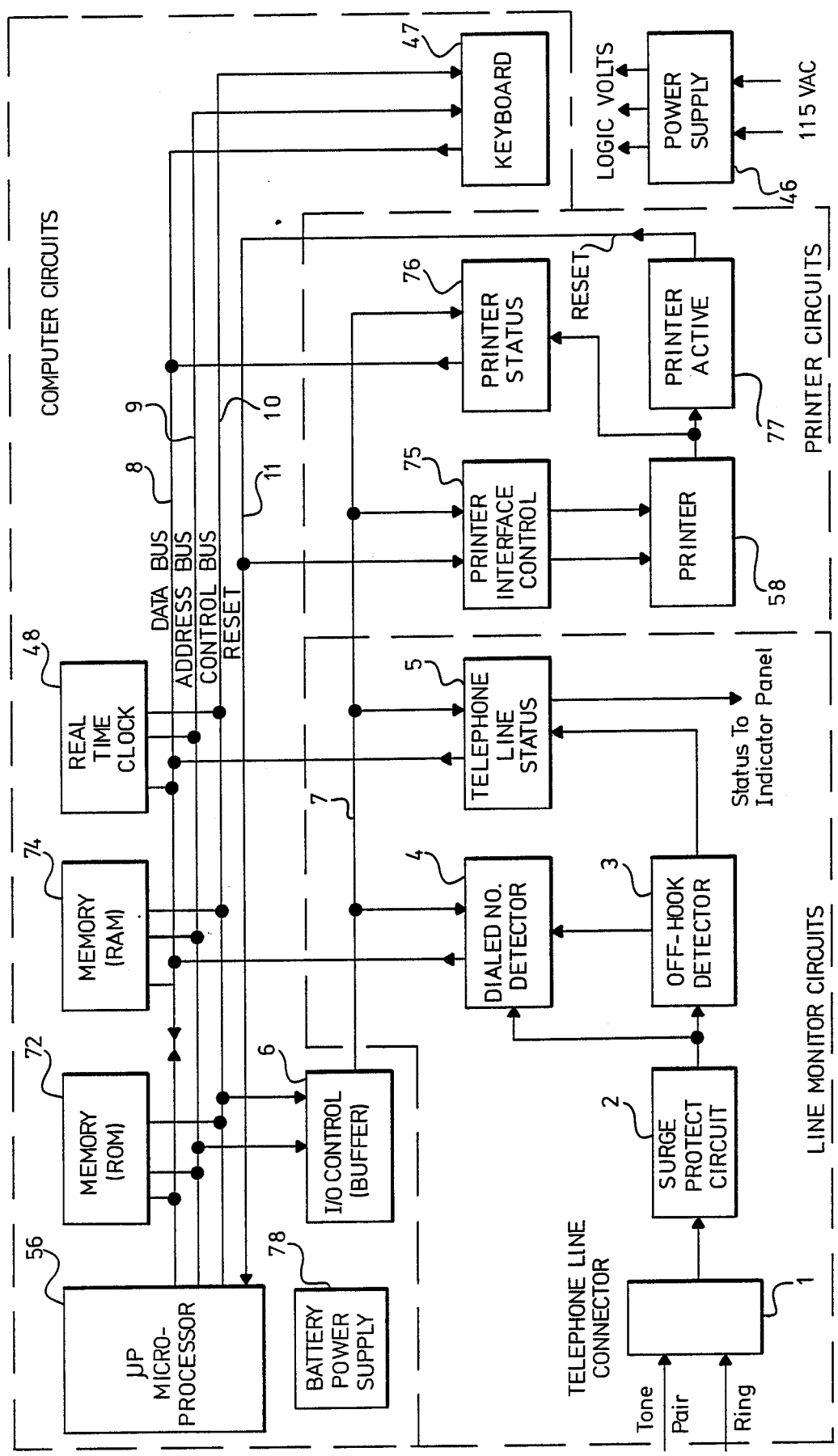
FIG. 1a is a block diagram of a preferred embodiment of the improved monitoring and recording apparatus, illustrating the relationships between the line monitor circuit means, the computer circuit means and the printer circuit means, in accordance with the principles of the present invention.

Referring initially to FIG. 1a, there is shown a block diagram of a preferred embodiment of the improved monitoring and recording apparatus. The functions of the apparatus are divided into three circuit means plus a power supply. These are: the line monitor circuit means, computer circuit means and printer circuit means.

Operation of the apparatus is as follows. Initially, using the keyboard 47, the real time clock 48 is set with the date and time of turn-on. Prior to this, using keyboard 47 the program memory 72 will have been set up with reference codes and other desired references. Power is supplied to the unit from a standard 115 vac, 60 or 50 cycle utility outlet via power supply 46, which contains a step-down transformer, rectifier circuits, and regulator circuits, providing regulated dc to all logic and control circuits.

Telephone connector 1 is connected to the telephone lines in parallel with one or more telephones. The connection should be made at a secured distribution point. When a call is being made, either by rotary dial or by pushbutton tone dial, the signals enter line connector 1 and surge protect circuit 2. They are thence communicated to off-hook detector 3 and dialed number detector 4. The off-hook detector 3 senses the off-hook condition, and transmits an enable signal to the dialed number detector 4. It also transmits an off-hook status signal to telephone status circuit 5. The microprocessor 56, by connection of address bus 9 and control bus 10, uses I/O control buffer 6 via I/O bus 7, to poll dialed number detector 4 and telephone line status 5. An off-hook condition is then transmitted via data bus 8 to memory 74.

The dialed pulses, whether tone or rotary pulse initiated, follow the path indicated above, resulting in communication with the microprocessor 56 and recording in memory 74. As the call progresses, call progress audible tones are received by the line monitor circuits. These call progress tones are sent from telephone switching systems to the calling parties (telephones being monitored) to show the status of the calls. Calling parties can identify the success of a call placed by what is heard after dialing. A signal detector sensitive to the frequencies most used is incorporated into the line monitor circuits. The timing of the detected signals is used to determine the nature of the call progress response. For example, dial tones are usually 'on' continuously at 350 and 440 cycles and last until the first digit is received by the switching system. 'Line busy' on the other hand, is on and off for a half second at 480 and 620 cycles. Another form of 'Line busy' signal at 480 and 620 cycles may be on and off in quarter second intervals. Voice is random, and ringback (audible) can be on for two to four seconds, depending on the phone system.

During the operation, telephone line status 5 accepts the signals input from the off-hook detector, processes them using internal differentiating circuits, and transmits to an indicator panel, enable signals that activate and illuminate a 'call in progress' indicator, an 'off-hook' indicator, a 'rotary dial' indicator and a 'DTMF' or 'Touch Tone' dial indicator. When the caller hangs up the phone, the action is sensed by the line monitor circuit which informs the microprocessor 56 via the telephone line status 5. The microprocessor 56 responds by connection of address bus 9 and control bus 10, via I/O control buffer 6 and I/O bus 7, directing printer 58 through printer interface control 75 to print the following information from memory:

(a) the number dialed,
(b) the month, day and time the call was made
(c) the number of rings and duration of the call.

For other cases, such as busy calls, calls terminated before the called party answers, special case calls with no ringback or voice detected for 12 seconds or more, or if the monitor apparatus is disconnected or reconnected for short periods, suitable information will be printed in place of item (c) and identified.

For incoming calls, the same circuits operate, except that when the call is completed, the printer will be directed to print out that the telephone was answered, in addition to the date, time and duration of the call.

While operating, the printer 58 communicates its status of operation with the microprocessor 56 via the printer status circuit 76 and the printer active circuit 77. 'End of line' and 'hammer timing' signals are generated by the printer 58. The 'end of line' signal is used by microprocessor 56 to determine when the end of a dot line has been reached, while the 'hammer timing' signal is used by microprocessor 56 to determine when to activate the print control lines through I/O control 6 and printer interface control 75. The 'end of line' signal is also sent by printer 58 to the printer active circuit 77, where it is processed by a differentiating circuit and a counter. If a binary count of 1111 is reached, a low signal is output as a reset to the microprocessor 56 via reset line 11, to shut off the printer 58. Under normal conditions, a binary count of 1111 will not be reached. However, after a power failure or upon initial application of power, the printer 58 will run until stopped by the reset signal sent by the printer active circuit 77.

After the apparatus is set up and operation initiated, keyboard 47 may be disconnected if so desired, to discourage unauthorized interference with the programmed operation of the monitoring apparatus. If the utility power should go down, the computer circuits are kept active by a small battery power supply 78. Loss of utility power is noted by the microprocessor 56, an alarm is given and the time recorded in memory 74.

Figure 1B:
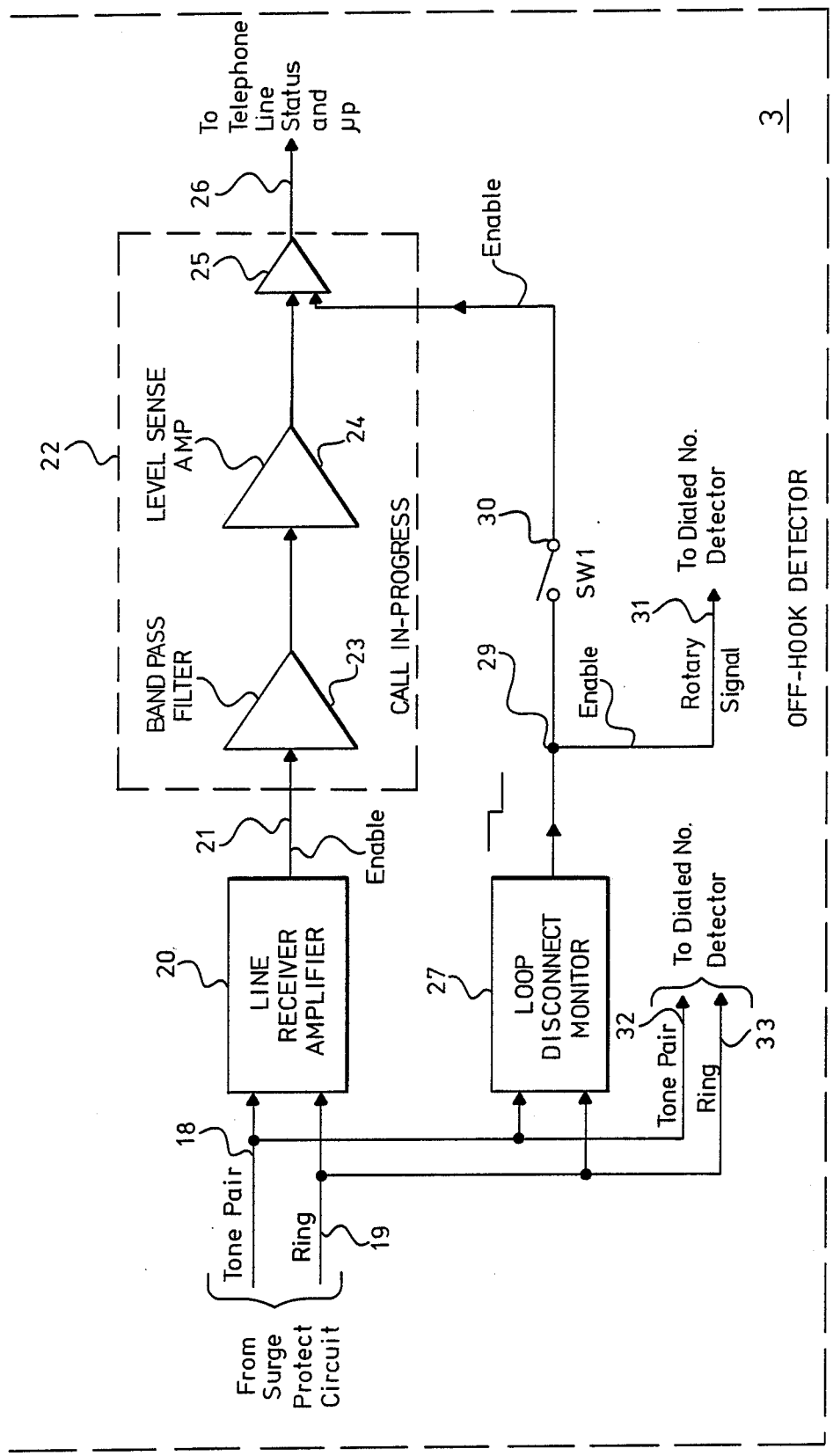
FIG. 1b is a block diagram of the off-hook detector circuit, and part of the line monitor circuit means, used to determine when a call is being made or received.
Figure 1C:
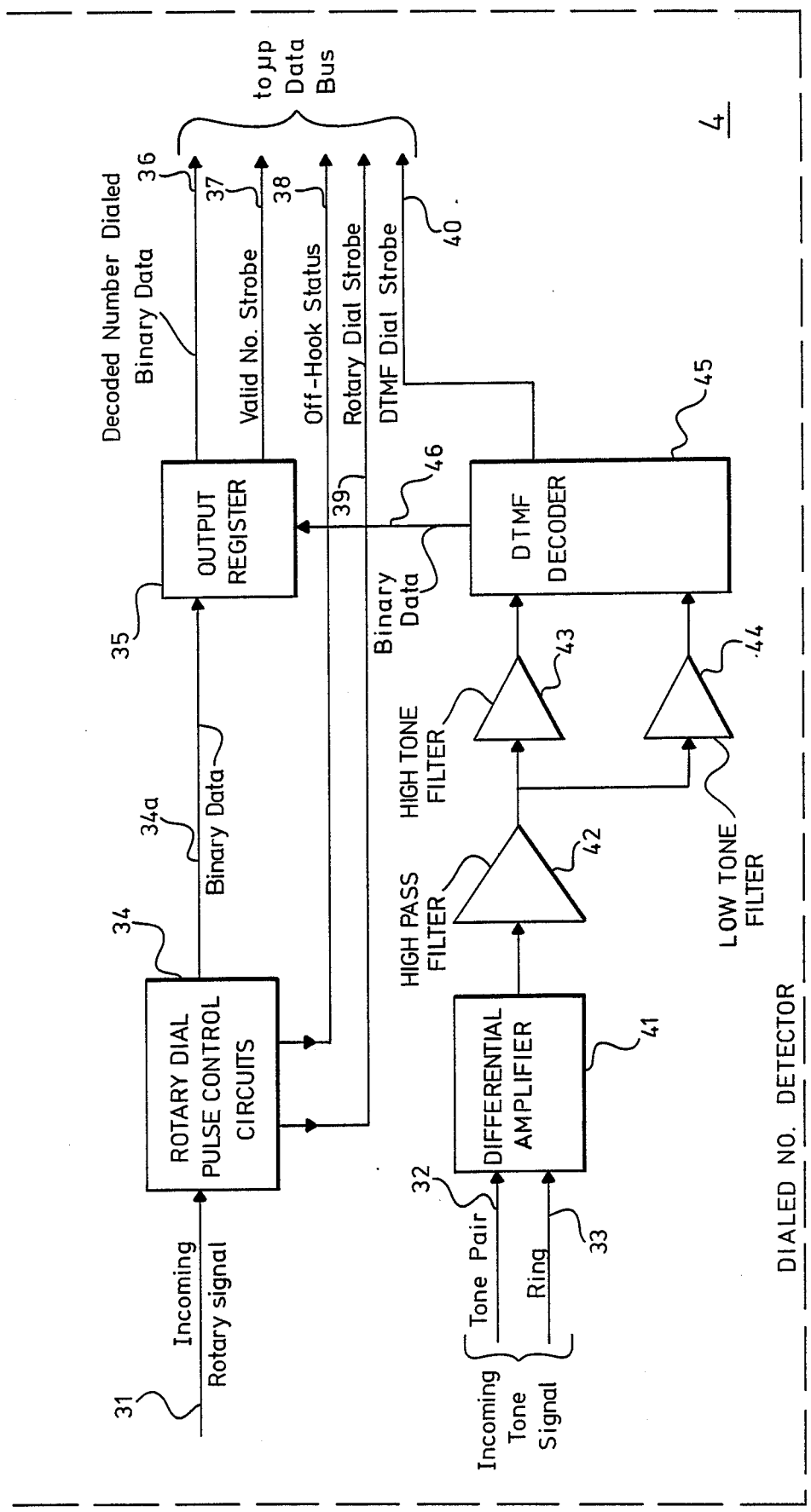
FIG. 1c is a block diagram of the dialed number detector circuit which is part of the line monitor circuit means.

Operation of the off-hook detector 3 and the dialed number detector 4 is now described. Referring now to FIGS. 1b and 1c, there are shown block diagrams of the off-hook detector 3 and dialed number detector 4. From the monitored telephone lines, tone pair and ring in signals are input at lines 18 and 19 to line receiver amplifier 20. The signals are also input in parallel to loop disconnect monitor 27 and to the dialed number detector 4 via lines 32 and 33. When a receiver on a monitored telephone is taken off-hook, line receiver amplifier 20 and loop disconnect monitor 27 sense the change by the change in tone pair signals. This is shown by the waveform in FIG. 4c for the output of the loop disconnect monitor at point 29. An enable signal is sent to the dialed number detector via line 31 and to the call-in-progress circuit 22 via line 21. The dialed number detector 4 via the rotary dial/pulse control circuit 34 sends out an off-hook status signal on line 38 to the microprocessor data bus 8.

Figure 4A:
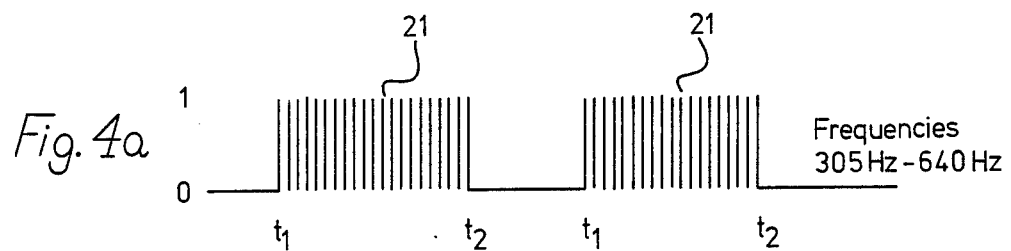
FIGS. 4a–4d are a set of graphs illustrating the waveforms at points in the line monitor circuits, and useful in understanding principles of the present invention.
Figure 4B:
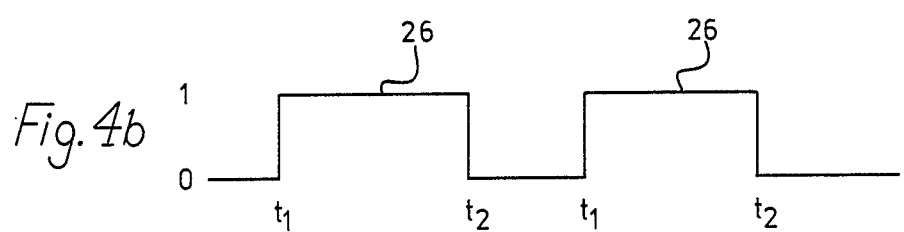
Figure 4C:
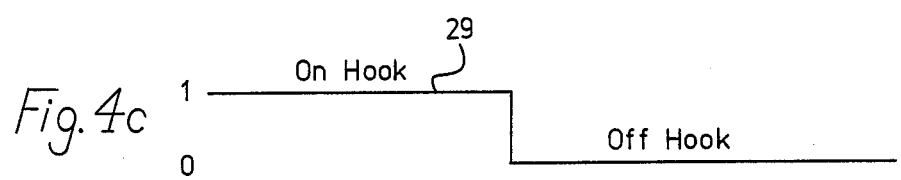
Figure 4D:
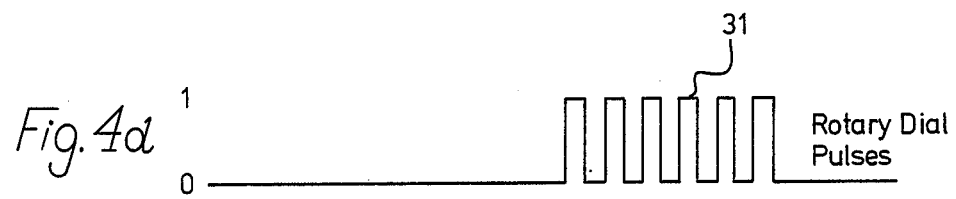

As the call is being made, signal frequencies of 305 Hz to 640 Hz, as illustrated in FIG. 4a appear on line 21 at the output of line receiver 20. These signal frequencies are communicated to bandpass filter 23 and thence to level sense amplifier 24 for output at gate 25. A frequency envelope signal, as illustrated in FIG. 4b is output at line 26 for transmittal to telephone line status circuit 5 and the microprocessor 56. Loop disconnect monitor 27 detects the opening and closing of the telephone line pair by the monitored telephone, to indicate the digit being dialed. These signals are output as rotary dial pulses on line 31 and connected to the rotary dial pulse control circuit 34 in the dialed number detector 3. The rotary dial pulses are illustrated for reference in FIG. 4d. The foregoing describes the activity in off-hook detector circuit 3 when a tone pair signal is received on line 18, indicating a call being made by a monitored telephone. However, when an incoming ring is detected, indicating an incoming call, the call-in-progress circuit 22 will normally monitor the call as long as gate 25 is enabled. The manual closing of switch 30 disables gate 25 and prevents the monitoring of the incoming signal, if so desired.

Referring particularly to FIG. 1c, incoming rotary dial pulses on line 31 are processed by the rotary dial pulse control circuit 34 which outputs binary data representing the pulses on line 34a which is connected to the input of output register 35 and a rotary dial strobe signal on line 39 to the data bus. Output register 35 decodes the pulse binary data and determines the digits being dialed. These digits are then coded into binary data and transmitted on line 36 to the microprocessor 56 via data bus 8. As each digit is finished transmitting to the microprocessor 56, output register 35 transmits a 'valid number' strobe signal on line 37 to the data bus 8. Microprocessor 56 senses the 'valid number' strobe signal and stores the binary code representing the digit, in memory 74. This process continues until each digit dialed is decoded and stored in memory 74.

When a complete telephone number is dialed and stored, microprocessor 56 starts polling the 'off-hook' status 38 signal and 'call-in-progress' signal on line 26 to determine the status of the call.

When the monitored telephone generates a tone-pair representing dual tone multifrequencies (DTMF), rather than rotary dial pulses, the circuit comprised of differential amplifier 41, high pass filter 42, high tone filter 43, low tone filter 44 and DTMF decoder 45, is activated. This circuit is also used when an incoming call rings in. Differential amplifier 41 and high pass filter 42 amplify and filter frequencies around 600 Hz. The purpose is to provide both filtering and amplification of the tone pair and ring back frequencies, while attenuating the higher audio frequencies associated with voice transmission. The output of high pass filter 42 is passed to two filters, high tone 43 and low tone 44, which separate out the highs and lows of the sampled signal, and input them to DTMF decoder 45. DTMF decoder 45 determines the type of signal being received on the basis of the sample period. That is, the time between highs of the signal. Binary data representing the tones are transmitted by line 46 to output register 35. DTMF decoder 45 also transmits a 'DTMF dial strobe' signal on line 40 to the data bus. As for the rotary dial pulses, output register 35 decodes the input binary data and determines the digits being dialed. The digits are then coded into binary data and transmitted on line 36 to the microprocessor 56 via data bus 8. The process of microprocessor recognition, storage in memory, and status polling, is the same as that described earlier for the rotary dialed pulses.

The circuits represented by the off-hook detector 3, the dialed number detector 4 and the telephone status 5, operate in the manner described above, whether processing the signals received by initiation of a call, or the end of the call. A random signal of random duration is determined as voice and no record is made of it, except to note in memory code that a voice conversation took place. Monitored calling telephones are identifiable by their tone and pulse signals, which are coded by the dialed number detector and passed to the microprocessor 56. Thus, if programmed to do so, the record will also include identification of the telephone making the call.

Figure 2A:
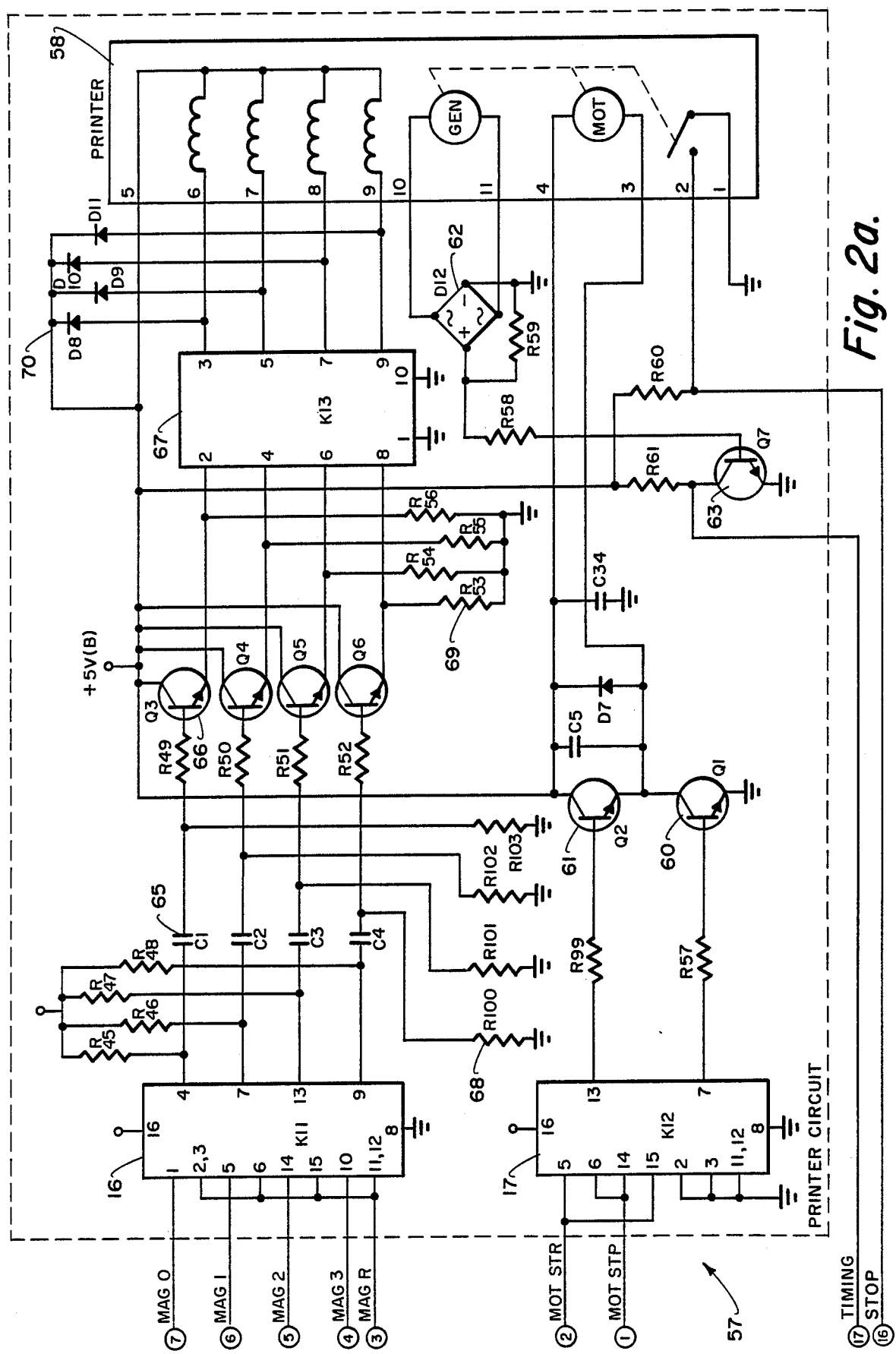
FIG. 2a is a schematic diagram of the printer circuits, illustrating particularly the printer and the printer interface control circuits.

Referring now to FIG. 2a, printer circuitry for printer 58 and printer interface control 75 is illustrated. Signals are generated by microprocessor 56 and transmitted via I/O control buffer 6 and I/O bus 7 to printer interface control 75, to control the operation of printer 58. A typical print cycle is as follows: first, a 'motor start' signal is sent by microprocessor 56 to buffer 17 via buffer chip 59 in the I/O control 6, thereby setting the signal at buffer 17. A high buffer signal 17 at pin 7 enables second transistor 60, providing a low on the motor start line of the printer. A low buffer signal 17 at pin 13 turns off third transistor 61, allowing all available current through the printer 58 motor. When second transistor 60 is turned off and third transistor 61 is turned on, power to the motor is removed. Secondly, print magnet timing is controlled by having the output of the printer pass to buffer 13. The low to high transition signals start of the print time. A high to low signal transition enables the stop of print time.

The printer output is passed through a full wave rectifier bridge 62 to convert the output (varying as a sine wave) to a pulsed direct current signal. This converted signal is squared and inverted by fourth transistor 63. A pulse train is created that is again inverted by inverter 64 and passed to buffer 13 to act as the pulse magnet timing interval. This timing signal is used by microprocessor 56 to generate the actual print magnet or 'hammer timing' signals. Thirdly, print magnet control is accomplished by having the four print magnet enable signals generated by buffer 59. Buffer 59 is a four line to sixteen line decoder device. The signal at buffer 59 is passed to latch 16. The output of latch 16 is a negative going pulse that is coupled through capacitor 65 to transistor 66. First transistor 66 in turn provides a drive signal to a quad transistor pack device 67. The transistors in 67 provide signal inversion and power to drive the print magnets in printer 58. A first resistor 68 is used to bias transistor 66 low to shut off the magnet drive transistor in quad transistor pack 67, in order to prevent the print magnets from burning up when power is initially applied. A second resistor 69 acts as a load resistor for transistor 66. Diode 70 protects quad transistor pack 67 from overshoot when the print magnet is turned off. After the print magnet is enabled, a reset pulse is generated by buffer 59 and passed to buffer 16. The foregoing is a description of one of the four print magnet circuits. The other three circuits are identical in operation.

Figure 3A:
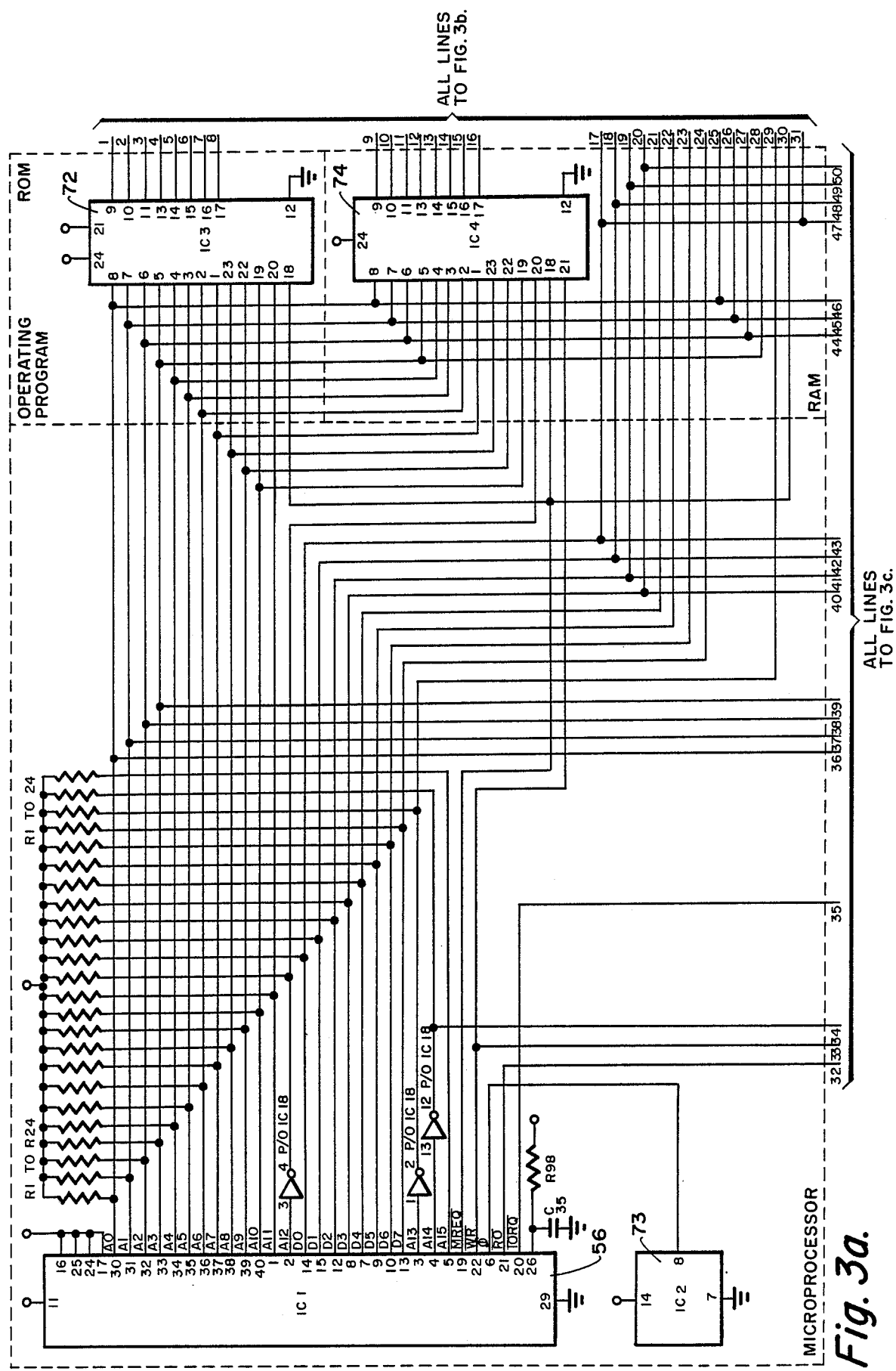
FIG. 3a is a schematic diagram of a portion of the computer circuit means, illustrating particularly the microprocessor and memory circuits.
Figure 3B:
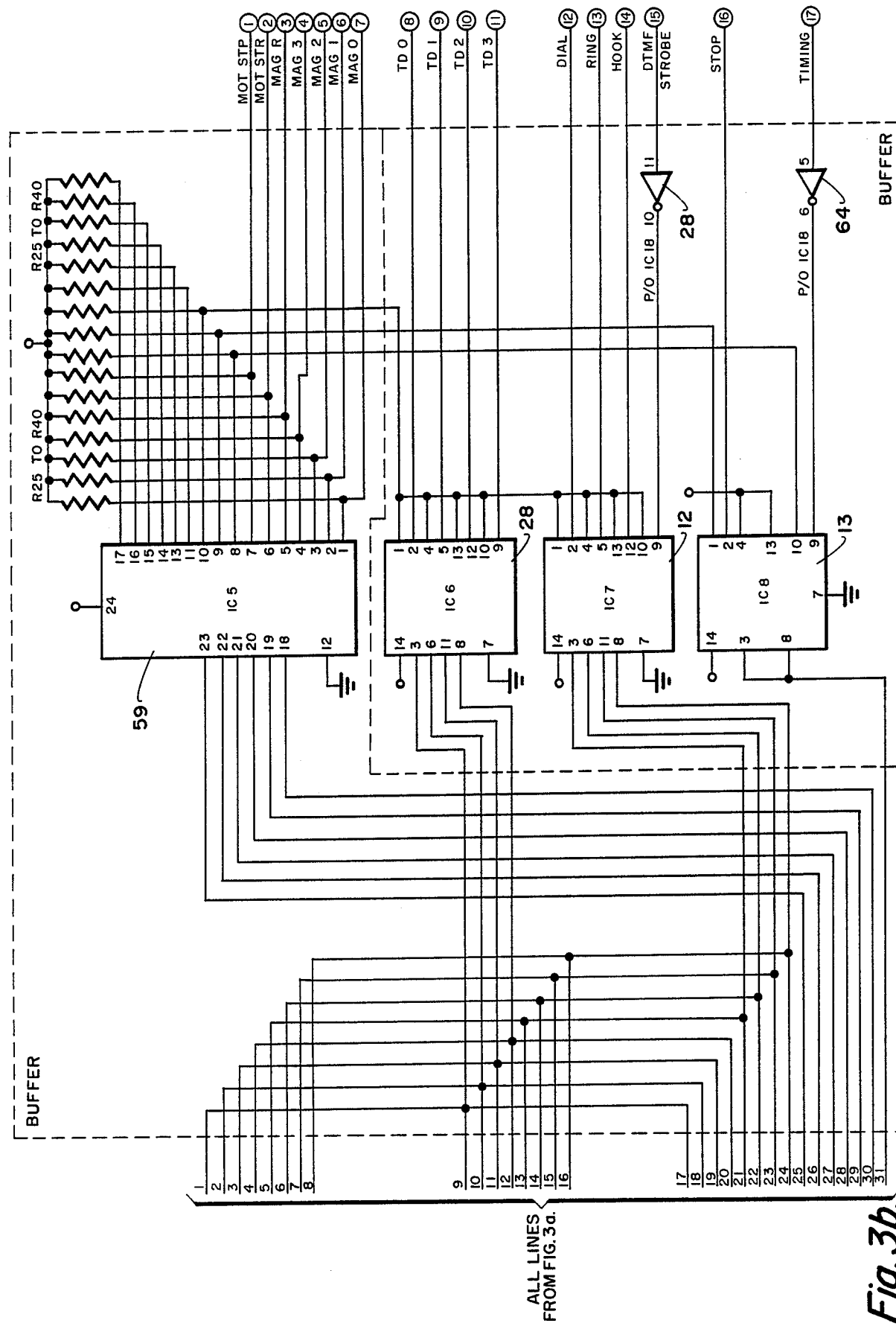
FIG. 3b is a schematic diagram of a portion of the computer circuit means, illustrating the I/O control buffer.
Figure 3C:
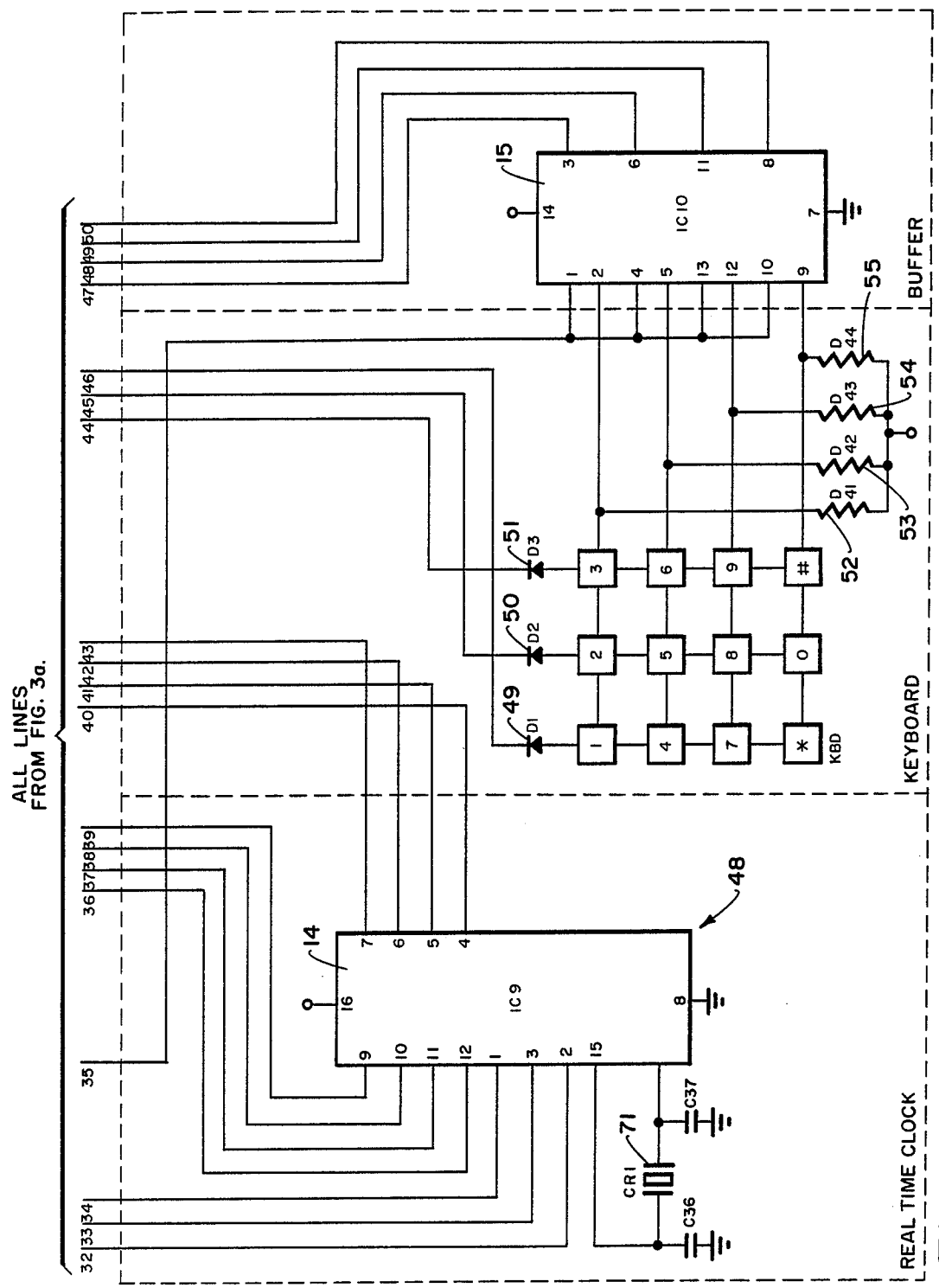
FIG. 3c is a schematic diagram of a portion of the computer circuit means, illustrating the real time clock, the keyboard and the keyboard buffer.

Refer to FIGS. 3a, 3b and 3c which are schematic diagrams of a preferred embodiment of the computer circuit means. The real time clock 48 is shown in the circuit embodied by integrated circuit 14, crystal 71 and a first and second capacitor. Chip 14 receives timing signals from crystal oscillator 71 and outputs a four line BCD word. Typically available commercial IC time chips provide an output representative of the day, date, day of month, time in hours, minutes and seconds.

The keyboard 47 is used to reset or initialize the real time clock 48 and enter coded information into program memory. In the preferred embodiment, a first buffer chip 15 is in circuit with first, second and third steering diodes 49, 50 and 51 and pull up resistors 52, 53, 54 and 55. A plurality of touch sensitive, membrane style keys are connected in row and column to the steering diodes and pull up resistors. In operation, the keyboard columns are strobed with pulses from microprocessor 56, so that if a key is pressed, a low output occurs on that key row and is passed to first buffer 15.

In the preferred embodiment, the microprocessor 56 is a 'Zilog' Z-80. However, any of the eight-bit microprocessors available can be used in this device, with minor modification of connection circuits. In general, the operating program for the apparatus is stored in a programmable read only memory (ROM) chip 72. Second integrated circuit 73 provides the timing signals for microprocessor 56, and is a single chip 2 megahertz oscillator. The information signals obtained from real time clock 48, the line monitor circuits, the printer circuits and keyboard 47 are temporarily stored in a random access memory (RAM) 74. Integrated circuits 28, 12 and 13 together with supporting resistors and inverters, function as I/O second, third & fourth control buffers, isolating microprocessor 56 from the rest of the circuits.

From the above description, it is apparent that the preferred embodiment achieves the objects of the present invention. Alternative embodiments and various modifications of the embodiments depicted and described, will be apparent from the above description to those skilled in the art. These and other alternatives are considered to be equivalent and within the spirit and scope of the present invention.

Having described the invention, what is claimed is:

1. An improved telephone monitoring and recording apparatus for the purpose of monitoring multiple or single telephones for both outgoing and incoming calls, and recording desired identification of the call number, its time, data and duration, said telephone monitoring and recording apparatus comprising:
   (a) line monitor circuit means connected to the telephone line for sensing dialing, call start and completion and telephone status;
   (b) computer circuit means for processing signals from said line monitor circuit means;
   (c) printer circuit means operatively connected to said computer circuit means, for providing a record of telephone calling activities; and
   (d) a power supply; said line monitor circuit means including a telephone line input connector, a surge protect circuit, an off-hook detector circuit, a dialed number detector circuit and a telephone line status circuit; said line monitor circuit being capable of continuously monitoring outgoing and incoming telephone calls and signals created by both tone and rotary pulse dialing telephone systems, without need of manual selection or switching.

2. The off-hook detector circuit of claim 1 wherein: said off-hook detector circuit comprises a line receiver amplifier, a call-in-progress circuit, a loop disconnect monitor circuit and a manual select switch; said line receiver amplifier having an input of tone pair and ring-in telephone signals communicated from said input connector and said surge protect circuit, and outputting amplified signal frequencies of 305 Hz to 640 Hz to said call-in-progress circuit; said call-in-progress circuit comprising a band-pass filter, a level-sense amplifier and a gate; said band-pass filter having an input of said amplified signal frequencies and having a frequency envelope signal output coupled to the input of said level sense amplifier; said level sense amplifier producing a square wave signal of defined amplitude at its output, and coupled to the input of said gate; said gate when enabled, outputting a square wave signal to said telephone line status circuit and to an indicator panel for displaying telephone status; said loop disconnect monitor circuit having a parallel input of tone pair and ring-in telephone signals connected from said input connector and said surge protect circuit; said loop disconnect monitor detecting the opening and closing of a telephone line pair signal by the calling station to indicate a digit being dialed by a rotary pulse dialing, and also a change in signal level indicating 'off-hook' status; said loop disconnect monitor outputting enable (low) and rotary dial pulses to said dialed number detector circuit; said manual switch being connected normally open in the line between the output of said loop disconnect monitor and an input to said gate, said switch enabling said gate when open, by a low signal, and disabling said gate by high pulse signals when manually closed.

3. The dialed number circuit of claim 1 wherein: said dialed number circuit comprises a rotary dial pulse control circuit, an output register, a differential amplifier, a high pass filter, a high tone filter, a low tone filter and a DTMP decoder; said dialed number circuit accepting telephone rotary pulse signals and tone pair signals as inputs and outputting an identification of the dialed number in addition to status signals; said rotary dial pulse control circuit having an input receiving rotary dial pulse signals from said loop disconnect monitor, said rotary dial pulse control circuit having three output signals which are (a) binary data representing the input rotary dial pulses, (b) an off-hook status signal low, and (c) a rotary dial strobe signal; said binary data signal being communicated to an input of said output register for decoding, said output register having a 'decoded number dialed' signal output in the form of binary data, said output register also outputting a 'valid number' strobe signal, which may be used to cause a microprocessor to store in memory said binary data representing said 'decoded number dialed' digits; said differential amplifier having an input receiving tone pair signals when present and 'ring-in' signals when present, said differential amplifier amplifying the input signals and coupling them to the input of said high pass filter; said high pass filter acting to filter frequencies around 600 Hz and attenuating the higher audio frequencies associated with voice; said high tone filter and said low tone filter receiving the output of said high pass filter, and acting to separate the 'highs' and 'lows' of said filtered signal, and communicating said 'high' and 'low' pulses to said DTMF decoder; said DTMF decoder determining the type of signal received and communicating binary data representing said tone pair signals or 'ring-in' signals, to said output register, said DTMF decoder at the same time outputting a DTMF dial strobe signal to initiate recognition of a DTMF signal; said output register accepting said binary data from said DTMF decoder and outputting a 'decoded number dialed' signal in binary data form and a 'valid number' strobe signal for transmission to a microprocessor, causing the microprocessor to store in memory said 'decoded number dialed' digits.

4. The telephone line status circuit of claim 1 wherein:
said telephone line status circuit contains internal differentiating circuits to process the signals from said off-hook detector and generates enable signals to illuminate status indicators on an indicator panel; said telephone line status circuit communicating the status signals to a microprocessor.

5. An improved telephone monitoring and recording apparatus for the purpose of monitoring multiple or single telephones for both outgoing and incoming calls, and recording desired identification of the call number, its time, date and duration; said telephone monitoring and recording apparatus comprising;
  (a) line monitor circuit means connected to the telephone line for sensing dialing, call start and completion and telephone status;
  (b) computer circuit means for prpocessing signals from said line monitor circuit means;
  (c) printer circuit means operatively connected to said computer circuit means, for providing a record of telephone calling activities; and
  (d) a power supply;
said printer circuit means comprsing a printer interface control circuit, a printer, a printer active circuit and a printer status circuit; said printer interface control being connected by an I/O control buffer to said computer circuit means and controlling the operation of the printer; said printer active circuit, when in receipt of a stop signal from the printer, outputting a reset signal commanding the printer to shut down; said printer status circuit operatively connected to the printer, sensing the status of printer operating modes and communicating printer status signals to said computer circuit means via a data bus; said printer interface control circuit comprising four identical print magnet channels and a motor control circuit; each one of said four identical print magnet channels comprising a latch, a first resistor, a first capacitor, a first transistor, a poriton of a quad transistor pack, a second resistor, and a diode; said print magnet channel operating to provide drive to a print magnet in a printer; said latch having an input pulse singal originating from said I/O control buffer and outputting a negative going pulse coupled through said first capacitor and thence to the base of said first transistor; said first resistor coupled to the base of said first transistor for the purpose of providing bias; the emitter of said first transistor connected to an input of said quad transistor pack, providing a drive signal to one of the transistors in said quad transistor; a second resistor acting as a load for said first transistor; said quad transistor pack providing signal inversion and power to drive a print magnet in a printer; said diode connected to the output of said quad transistor to provide protection from overshoot when said print magnet is turned off; said motor control circuit comprising a buffer, a second, third and fourth transistor, a full wave rectifier bridge and supporting circuit components, and operatively connected in such a manner as to prov,ide power and control to the printer motor; upon receipt of a motor start, signal, said buffer provides an enable signal coupled to the base of said second transistor, sasid second transistor turning on and providing a low signal on a printer motor start line operating said motor; upon receipt of a 'motor stop' signal, said buffer provides an enable (low) signal coupled to the base of said third transistor turning it on, at the same time removing the enable signal to said second transistor, turning it off, resulting in removing power from said printer motor and turning it off, said full wave rectifier bridge being coupled to a generator signal related to a printer position and converting the sine wave input to a pulsed direct current signal; said pulsed direct current signal being coupled to the base of said fourth transistor and squared and inverted by said fourth transistor, creating a pulse train; said pulse train signal being passed to a buffer and acting as a pulse magnet timing interval; said pulse magnet timing interval capable of being used by a microprocessor to generate print magnet 'hammer timing'; signals as required for operation of a printer.

* * * * *